US010248965B2

(12) United States Patent
Cohen et al.

(10) Patent No.: US 10,248,965 B2
(45) Date of Patent: Apr. 2, 2019

(54) LOCATION ORIENTED MEMBERSHIP CODE DEVICE

(71) Applicant: International Business Machines Corporation, Armonk, NY (US)

(72) Inventors: Guy M. Cohen, Ossining, NY (US); Lior Horesh, North Salem, NY (US); Raya Horesh, North Salem, NY (US); Marco Pistoia, Amawalk, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/090,941

(22) Filed: Apr. 5, 2016

(65) Prior Publication Data
US 2017/0286726 A1    Oct. 5, 2017

(51) Int. Cl.
| G06Q 30/02 | (2012.01) |
|---|---|
| G06K 19/077 | (2006.01) |
| G06K 19/06 | (2006.01) |
| G06K 7/10 | (2006.01) |
| G06Q 20/32 | (2012.01) |
| G06Q 20/34 | (2012.01) |

(52) U.S. Cl.
CPC ....... *G06Q 30/0236* (2013.01); *G06K 7/1095* (2013.01); *G06K 19/06112* (2013.01); *G06K 19/07705* (2013.01); *G06K 19/07707* (2013.01); *G06Q 20/3224* (2013.01); *G06Q 20/3276* (2013.01); *G06Q 20/3278* (2013.01); *G06Q 20/34* (2013.01); *G06Q 30/0207* (2013.01)

(58) Field of Classification Search
USPC .......................................................... 235/380
See application file for complete search history.

(56) References Cited

U.S. PATENT DOCUMENTS

| 7,353,996 B2 | 4/2008 | Goodman et al. |
|---|---|---|
| 9,016,565 B2 | 4/2015 | Zhou et al. |
| 2008/0074264 A1* | 3/2008 | Sharpe .................... H04L 67/20 340/572.1 |
| 2008/0230603 A1* | 9/2008 | Stawar .................. B62B 3/1408 235/383 |
| 2012/0118976 A1 | 5/2012 | Debski |
| 2015/0248664 A1* | 9/2015 | Makhdumi ........ G06Q 20/3274 235/380 |

(Continued)

OTHER PUBLICATIONS

"British Airways to start using NFC-enabled E Ink luggage tags", Matthew Humphries, Chips, Jun. 28, 2013, 4 pgs.

(Continued)

*Primary Examiner* — Michael G Lee
*Assistant Examiner* — David Tardif
(74) *Attorney, Agent, or Firm* — Harrington & Smith

(57) ABSTRACT

A method, apparatus, and a computer product are provided for a location oriented membership code device. The method includes storing, in a memory of a device, one or more identifiers, wherein each of the one or more identifiers is associated with one or more locations; determining that the device is within a range of a location associated with at least two of the identifiers; selecting which of the least two identifiers to retrieve from the memory of the device based at least partially upon past user behavior; and displaying an indication of the selected identifier on a display of the device.

20 Claims, 4 Drawing Sheets

(56) References Cited

U.S. PATENT DOCUMENTS

2015/0324181 A1* 11/2015 Segal .................... G06F 9/5088
717/178

OTHER PUBLICATIONS

"Geode from iCache", iCache, Inc., Jan. 11, 2016, 7 pgs.
"All of your loyalty cards. One app.", CardStar, Jan. 11, 2016, 2 pgs.
"Tame your cards", https://keyringapp.com, Jan. 11, 2016, 6 pgs.

* cited by examiner

LOCATION ORIENTED MEMBERSHIP CODE DEVICE

BACKGROUND

This invention relates generally to display devices and, more specifically, relates to location oriented membership code devices.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

A number of loyalty programs, store membership cards, passes, gift card, event tickets, and the like, utilize barcodes in order to properly identify the owner of the card or ticket. Sometimes stores will provide a keychain 'tag' to make the process of scanning the membership code easier. Additionally, software applications have been developed so that the cards may be stored in a central location on user's mobile phone. However, due to how many membership cards a typical person uses keychain bundles are becoming cumbersome. Also, finding the correct membership keychain tag among many others tags can be frustrating. Similarly, the aforementioned software applications require the user to turn on the display, find the correct application, and identify the correct membership card. Most mobile phones also have screens that can cause problems when the barcode scanner is trying to read a barcode, for example, the screen may be too reflective or the brightness of the screen might not be high enough. In either case, the process of scanning the barcode is slow.

SUMMARY

According to an embodiment described herein a method is provided. The method including storing, in a memory of a device, one or more identifiers, wherein each of the one or more identifiers is associated with one or more locations; determining that the device is within a range of a location associated with at least two of the identifiers; selecting which of the least two identifiers to retrieve from the memory of the device based at least partially upon past user behavior; and displaying an indication of the selected identifier on a display of the device.

According to another embodiment described herein an apparatus is provided. The apparatus includes at least one processor; and at least one non-transitory memory including computer program code; the at least one memory and the computer program code may be configured to, with the at least one processor, cause the apparatus to: store, in a memory of a device, one or more identifiers, wherein each of the one or more identifiers is associated with one or more locations; determine that the device is within a range of a location associated with at least two of the identifiers; select which of the least two identifiers to retrieve from the memory of the device based at least partially upon past user behavior; and display an indication of the selected identifier on a display of the device.

According to another embodiment described herein a computer program product is provided. The computer program product includes a computer readable storage medium having program instructions embodied therewith. The program instructions executable by a device to cause the device to: store, in a memory of the device, one or more identifiers, wherein each of the one or more identifiers is associated with one or more locations; determine that the device is within a range of a location associated with at least two of the identifiers; select which of the least two identifiers to retrieve from the memory of the device based at least partially upon past user behavior; and display an indication of the selected identifier on a display of the device.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for a location oriented membership code device. Additional description of these techniques is presented after a system into which the exemplary embodiments may be used is described.

The word 'membership card' is used herein to refer to membership cards, passes, gift cards, transportation tickets, event tickets, coupons and the like.

Figure 1:
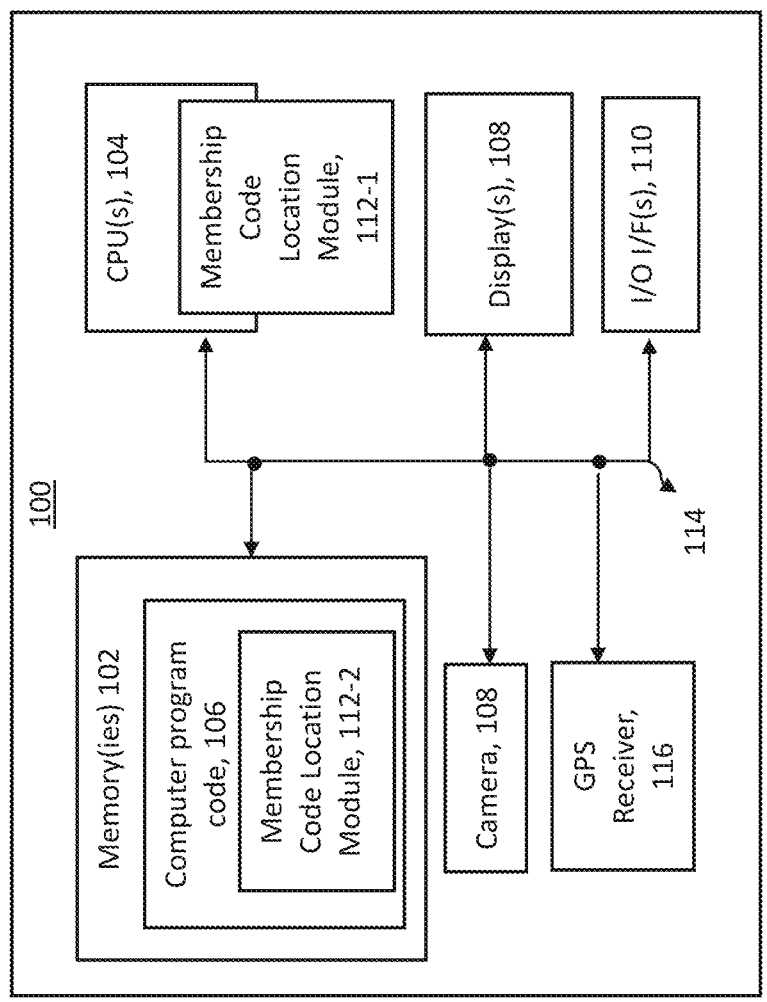
FIG. 1 is a block diagram of one possible and non-limiting exemplary system in which the exemplary embodiments may be practiced.

Referring to FIG. 1, this figure shows a block diagram of one possible and non-limiting exemplary system in which the exemplary embodiments may be practiced. In FIG. 1, a membership code device 100 includes one or more processors (shown as CPU(s), central processing units) 104, one or more memories 102, one or more displays 108, and one or more I/O I/F(s) 110 (input/output interfaces) interconnected through one or more buses 114. The one or more buses 114 may be address, data, or control buses, and may include any interconnection mechanism, such as a series of lines on a motherboard or integrated circuit, fiber optics or other optical communication equipment, and the like. The one or more memories 102 include computer program code 106. The membership code device 100 includes a membership location module 112, comprising one of or both parts 112-1 and/or 112-2, which may be implemented in a number of ways. The membership code location module 112 may be implemented in hardware as membership code location module 112-1, such as being implemented as part of the one or more processors 104. The membership code location module 112-1 may be implemented also as an integrated circuit or through other hardware such as a programmable gate array. In another example, the membership code location module 112 may be implemented as membership code location module 112-2, which is implemented as computer program code 106 and is executed by the one or more processors 104. For instance, the one or more memories 102 and the computer program code 106 may be configured to, with the one or more processors 104, cause the membership code device 100 to perform one or more of the operations as described herein.

Examples of the display(s) 108 may be any commonly known graphical display screen or projector for displaying graphical images, such as a barcode image. Although illustrated as separate blocks, the display(s) 108 and the I/O I/F(s) 110 may be integrated with one another, such as may be the case with a touch screen device. The display(s) 108 may utilize any suitable display technology such as CRT, LED, OLED, Plasma, DLP and the like.

In an example embodiment, one or more of the displays(s) 108 may be an electronic ink (E-Ink) display. An E-ink display is a display that reflects external light sources similar to a paper barcode tag. Thus, a barcode image E-ink displays may be easier for optical scanners to read a membership code from. E-ink displays are also very power efficient as compared with LED or OLED, which allows battery life to be much longer as opposed to other types of displays.

The membership code device 100 may also include a camera 108 for capturing images which are then stored in memory(ies) 102. The one or more I/O I/F(s) 110 may include any suitable interface for transferring information to or from the membership code device 100. Examples of an I/O I/F(s) 110 may include, but are not limited to, USB interfaces; wireless and wired network interfaces, such as Ethernet, NFC, Bluetooth, Wi-Fi, and the like. The membership code device 100 may also include a GPS receiver 116. In some example embodiments the I/O I/F(s) may receive input form physical buttons on the membership code device 100 or input from touch screen devices. In one example, the membership code device 100 may include an RFID system utilizing active or passive RFID tags.

The computer readable memory(ies) 102 may be of any type suitable to the local technical environment and may be implemented using any suitable data storage technology, such as semiconductor based memory devices, flash memory, magnetic memory devices and systems, optical memory devices and systems, fixed memory and removable memory. For example, in one embodiment the data storage technology may be nonvolatile memory which does not require a power source to maintain the data, such as flash memory, phase change memory, and resistive memory. The computer readable memories 102 may be means for performing storage functions. The processors 104 may be of any type suitable to the local technical environment, and may include one or more of general purpose computers, special purpose computers, microprocessors, digital signal processors (DSPs) and processors based on a multi-core processor architecture, as non-limiting examples. The processors 104 may be means for performing functions, such as controlling the membership code device 100, and other functions as described herein.

In general, the various embodiments of the membership code device 100 can include, but are not limited to, a keychain accessory device, a digital card device with approximately the same size as a credit card, wearable portable computers, as well as portable units or terminals that incorporate combinations of such functions. The embodiments may also include: a wallet (e.g. one face of the wallet may have the membership code device 100 embedded thereon); a credit card, thereby minimizing the need to carry additional devices. The membership code device 100 may be a mobile phone cover or casing. Nowadays, most users place their mobile phone inside a protective casing, and so having one the casing includes the membership code device 100 would spare the redundant need of carrying an additional device. Further, in one embodiment the membership code device 100 may include a miniature projector where membership information is projected from the projector for displaying the membership information as described below. In another embodiment, the membership code device 100 may be a key, such as a car key or a house key.

As described in the background above, it is becoming more difficult to carry and organize the large number of membership cards, loyalty program cards, tickets, coupons, event passes, and the like that people use on a day-to-day basis. Although some solutions have attempted to address this issue, the current solutions are still slow and cumbersome to users. For example, various software applications have been developed for mobile phones where cards can be stored and organized. However, these solutions still require a user to turn on their phone, find the application on their phone, and find the appropriate card within the application. This process is not intuitive and often causes delays for businesses in checking out customers or longer lines at events or places like gyms which require a membership card to be presented upon entry. Embodiments described herein address these issues and offer a faster, easier solution for users to present membership cards so that the can be scanned. For retailers, the payment process is accelerated, thereby allowing more customers to be processed per cashier/employee over a given time period. For the consumer, the annoyance and time waste associated with searching for the right membership card is spared.

According to embodiments described herein a device (e.g. membership code device 100) is provided that allows a user to scan or transfer membership card information from one or more membership cards to the device. When this information is sent to the device, the device can recognize any membership codes from the membership card information, such as a barcode, a q-code, account numbers, or the like, and store the information in the device's memory. For example, the captured image can be stored directly on the device, or in some embodiments the membership code (e.g. barcode) is scanned from the image. The captured image can also be analyzed and the membership code (e.g. barcode or membership number) will be extracted and regenerated in a cleaner format. When the user enters a location associated with one of the memberships cards that has been pre-loaded into the device, the device automatically displays the relevant card information that is associated with that location. For example, if a person enters a BARNES AND NOBLE store then the BARNES AND NOBLE royalty card will be automatically displayed. In this way, the user will not have carry multiple different memberships cards or take the time to find the membership card.

In an example embodiment, the membership code device comes preloaded with points-of-interest, such as popular books stores, supermarkets information will be already available. The preloaded points-of-interest data can be used in a number of ways. The preloaded data can help minimize the need for a user to input information. For example, if a user is near or has entered a BARNES AND NOBLE store, a membership code device having preloaded BARNES AND NOBLE data can cause the membership code device to automatically query the user to apply for a BARNES AND NOBLE loyalty card. The membership code device may already have the user's personal data stored in the device, and thus can generate the BARNES AND NOBLE loyalty card and transmit a "filled application form" based on the user's stored information to BARNES AND NOBLE.

Additionally, the preloaded points-of-interest data can provide store location information that is matched with GPS, Wi-Fi information, etc. from the membership code device. The preloaded points-of-interest data can provide additional store details, for example, store hours. The preloaded points-of-interest information can provide a monetization opportunity, for example, by charging small fees to businesses who are included in the point-of-interest and/or by offering coupons from businesses that are displayed on the device.

Figure 2A:
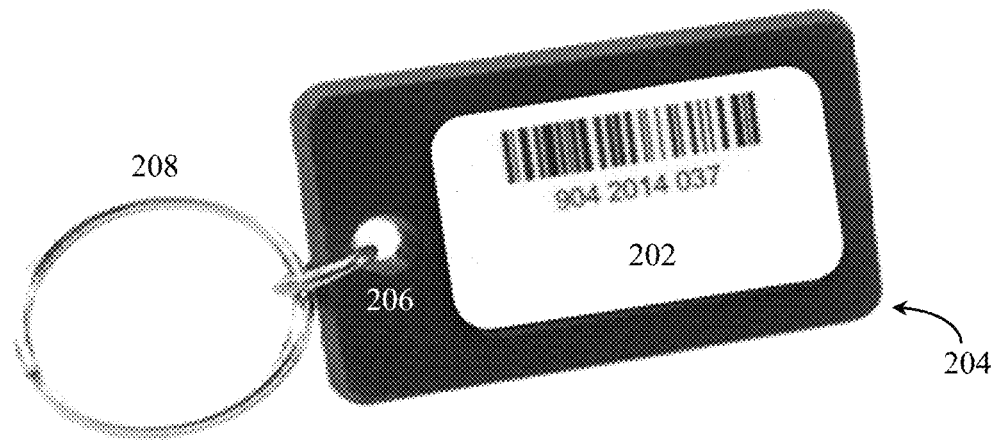
FIG. 2A and FIG. 2B illustrate an example of a keychain device in accordance to some embodiments.
Figure 2B:
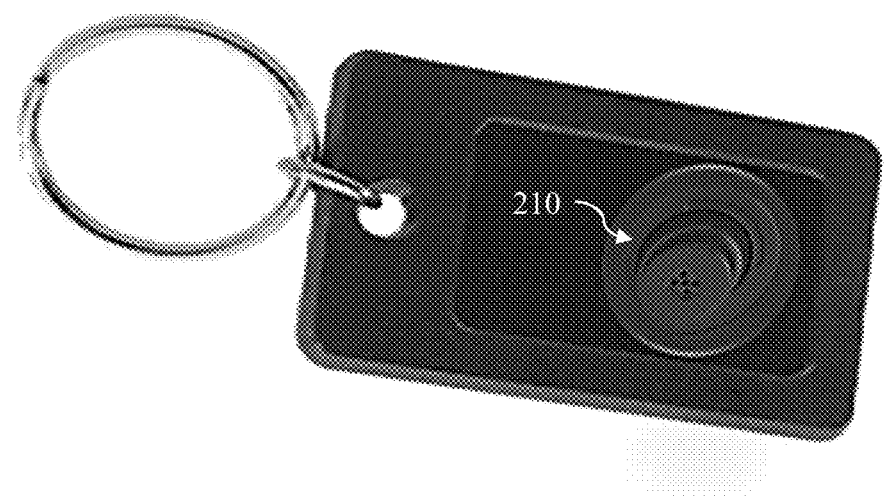

Referring now to FIGS. 2A and 2B, these figures show one example of a membership code device 100, which is embodied as keychain device 200. The keychain device 200 is approximately the size of a keychain-size barcode tag. FIG. 2A shows a front-side of the keychain device 200. The keychain device 200 includes a screen 202 and a housing 204. The housing 204 includes an opening 206 for attaching a keyring 208. The display 202 may be, for example, an E-Ink display. FIG. 2B shows a backside of the keychain device 200. The back-side of the keychain device 200 includes a camera 210 which may be used, for example, to capture information from membership cards.

Figure 3:
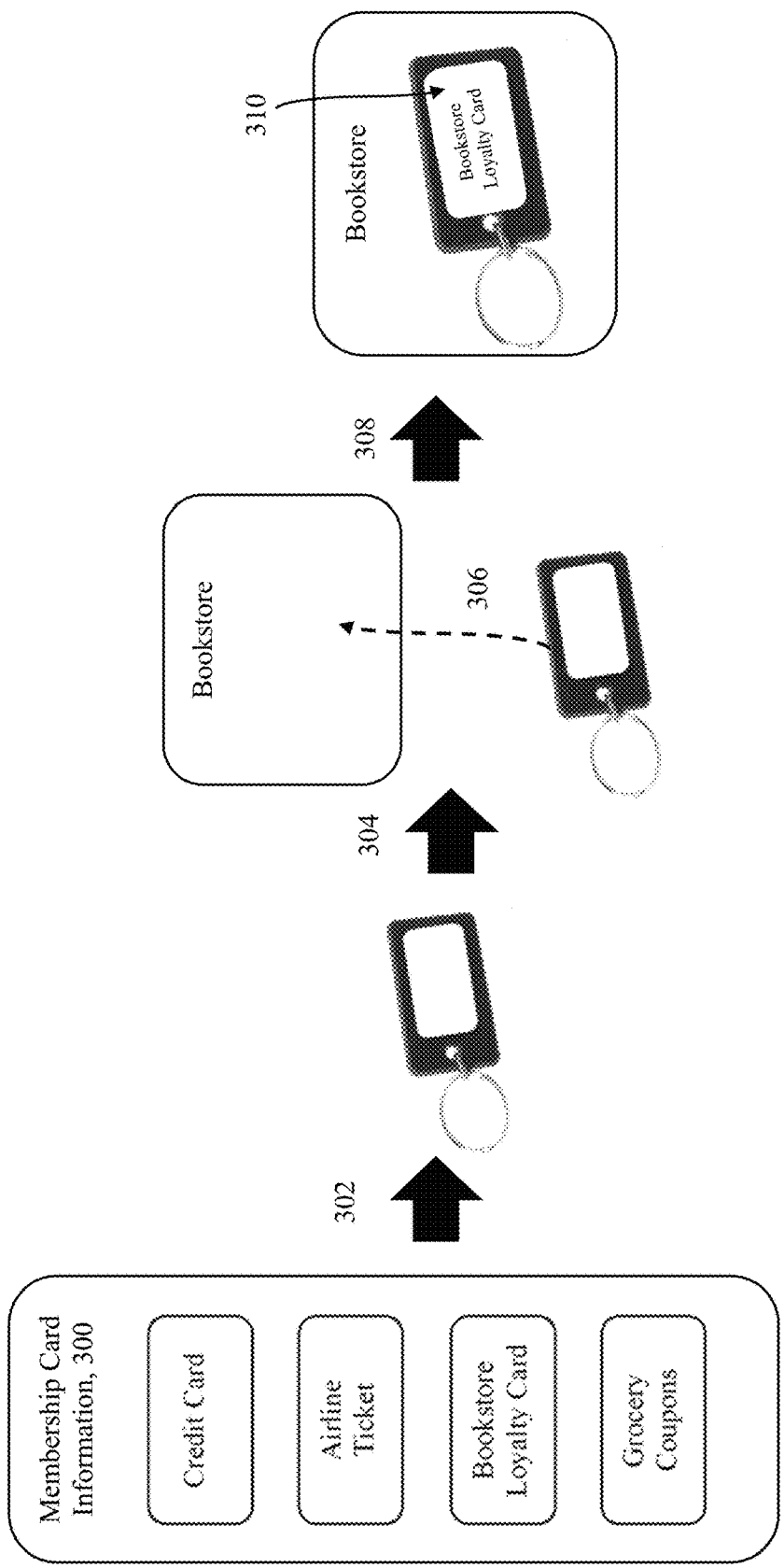
FIG. 3 is a high level flow chart according to embodiments described herein.

Referring now to FIG. 3, this figure shows a high level flow chart according to an exemplary embodiment. Each step of the flow chart is detailed more thoroughly below. The process starts when the information from membership cards 300 is transferred and stored in a memory of the membership card device 100 (e.g. memory(ies) 102). In the example of FIG. 3, the membership code device 100 is shown as keychain membership code device 200 of FIG. 2. At step 304, the membership code device enters a location that it is associated with one of the membership cards which is represented by arrow 306. In this example, the location is a Bookstore and the associated membership card is the Bookstore Loyalty Card that was previously stored in the memory of membership code device at step 302. In response to entering a range of the Bookstore, the membership code device retrieves the information associated with the Bookstore Loyalty Card at step 308 and displays this information on the screen of the membership code device as shown at 310.

Returning now to the storage step 302 of FIG. 3, the membership card information 300 may be transferred and stored in different ways. For example, the membership code device may capture an image of each membership card using a camera and analyze the image for barcodes, account information, stores/events associated with the membership card, etc. The membership code device may, for example, process the image so as to store only the relevant portions of the image, e.g. the barcode. Alternatively, the image may be processed such that membership code device creates a reproduction of the relevant information to be stored in memory. For example, the membership code device may reproduce the barcode, account numbers, text of the membership card. In this way, the membership information can be displayed clearly and consistently across different types of membership cards. In another example, the membership code device may physically (e.g. a USB connection) or wirelessly (e.g. Bluetooth, NFC, Wi-Fi, etc.) connect to different device (e.g. cellular phone, tablet, or computer). The device may then transfer the membership card 300 information to the membership code device. In another example, the membership information 300 may be pre-loaded on the membership code device, e.g. by a retail store. In another example, the membership information 300 may be manually entered by a user of the membership code device (e.g., via I/O I/Fs. 110).

Returning now to the location determination step 304 of FIG. 3, at step 304 the membership code device determines that it is within a range of a location associated with at least some of the stored membership card information 300. The membership code device may make this location determination in a number of different ways. In one embodiment, the location is determined using a GPS signal. In another embodiment the location is determined based on a Wi-Fi network signature. In another embodiment the location is determined using a designated local signal.

In another embodiment the location is determined using RFID. For example, a store that uses RFID for membership codes may identify the membership code device 100 based on a stored RFID code. The membership code device 100 may include programmable RFID functionality such that the device may contain more than one RFID code.

In example embodiments, the membership code device uses machine learning techniques to learn and identify which membership code to display based on past data of user's behavior and GPS location and accuracy. The machine learning techniques can utilize collective and/or personal information for better localization and to more accurately identify membership card information. Utilizing these types of machine learning techniques can improve the user experience of the membership code device in a number of ways.

To better utilize the personal information, a machine learning algorithm can learn the specific user's behavior. For example, if the user goes to a specific coffee shop every morning, the device can already display the membership card a-priori in a predictive fashion, based on the context (for example the time of the day and proximity to the location). A further example is when the location determination step 304 may not have an accurate enough location signal to determine where the membership code device is located, or there may be a number of different locations nearby that are associated with different membership information (e.g. a shopping mall). In these situations the membership code device must determine which membership information to retrieve and display. This decision may be based on a number of factors, e.g., frequency of visits of a particular location, time, date, store hours, etc. For example, the membership code device may detect that the following locations are nearby: a coffee shop that is frequently visited by the user of membership code device in the morning, a frequently visited take-out restaurant, and retail store that is open but only occasionally visited. During the morning hours the membership code device displays the coffee shop membership information, whereas in the evening hours the restaurant information is displayed. If both the coffee shop and the restaurant are closed when the membership code device is nearby all three locations, then the retail store membership card information is displayed. Optionally, if the coffee shop membership card information has already been recently scanned then the membership card device may display the next closest and/or relevant membership card information, e.g., the retail store membership information. Thus, the membership card device may account for the fact that a user is more likely to visit, e.g., the retail store than to re-visit the same coffee shop twice in a certain time period.

Another way machine learning techniques may be used is to aggregate user information from a plurality of such devices. In this way, the aggregated information may be used, for example, to correct store locations and share that information between users. These techniques help constantly improve the location based services. By utilizing machine learning techniques, the membership code device can make intuitive decisions on which information should be displayed to the user. In the case for collective information, information from multiple users is analyzed and shared through a cloud. The algorithm can learn which membership card to display in each store based on the information collected from multiple users. For example, this can help in situations where a specific store is not already in the database but multiple users have entered the store and choose a specific membership card. The collective information may also be used to better calibrate the localization of a specific store and update this information in the database. The database (store location and associated card) can be stored on the cloud or locally on the membership code device 100. In some embodiments, the machine learning techniques may leverage the preloaded points-of-interest data mentioned above.

In some example embodiments, the membership code device includes one or more of: speaker(s), vibrating mechanism(s), and/or light(s) for providing feedback to the user. For example, the feedback may include a notification to the user's other mobile device (e.g. smartphone). For example, when the membership code device enters a certain location the device may vibrate, play a sound, or light up to indicate that the membership code device location is within a range a location that associated with membership information stored on the device. The various types of feedback may also include, for example, an indication that: the membership code device has been scanned, membership information has been successfully stored; or feedback to a user input (e.g. a touch input, a physical button input). In some embodiments, the membership code device 100 may include various security features, such as a finger print scanner or image based identification feature. These security features may help unauthorized use of membership codes in situations if the membership code device is lost or stolen.

Figure 4:
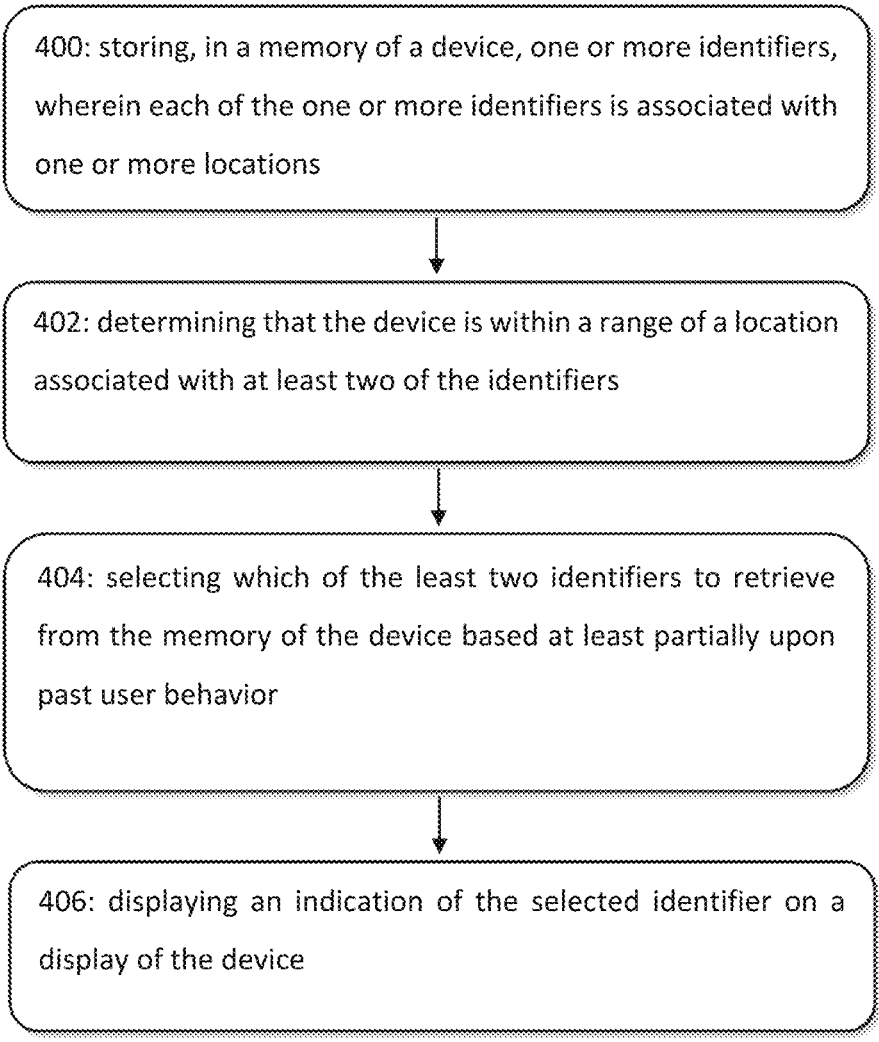
FIG. 4 is a logic flow diagram for location oriented membership code device, and illustrates the operation of an exemplary method, a result of execution of computer program instructions embodied on a computer readable memory, functions performed by logic implemented in hardware, and/or interconnected means for performing functions in accordance with exemplary embodiments.

FIG. 4 is a logic flow diagram for semantic-based queries using word vector representation. FIG. 4 illustrates the operation of an exemplary method, a result of execution of computer program instructions embodied on a computer readable memory, functions performed by logic implemented in hardware, and/or interconnected means for performing functions in accordance with exemplary embodiments. It is assumed that a membership code device, e.g. membership code device 100 of FIG. 1, performs the blocks in FIG. 4, but the blocks may also be performed in combination with another device.

Referring to FIG. 4, an exemplary method may comprise storing, in a memory of a device, one or more identifiers, wherein each of the one or more identifiers is associated with one or more locations as indicated by block 400; determining that the device is within a range of a location associated with at least two of the identifiers as indicated by block 402; selecting which of the least two identifiers to retrieve from the memory of the device based at least partially upon past user behavior as indicated by block 404; and displaying an indication of the selected identifier on a display of the device as indicated by block 406.

The storing the at least one identifier may include capturing an image using a camera of the device and analyzing the image to determine the at least one identifier associated with the one or more locations. The indication of the selected identifier may comprise a scannable optical code. The storing the one or more identifiers may comprise receiving the one or more identifiers from another device, and the one or more identifiers may be at least one of an optical code and a radio frequency identifier. The determining the device is within the range of the location associated with at least two of the identifiers is based on a location signal. The location signal may be at least one of: a GPS signal, a Wi-Fi signal, and a RFID signal. The one or more identifiers may be at least one of: a coupon, a ticket, a membership card, and a payment card. The method further may further include, in response to a user input, displaying an indication of another identifier associated with the determined location. The device may be at least one of: a keychain device and a wearable device. The display of the device may be an e-ink display. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

An example embodiment may be provided in an apparatus, for example membership code device 100 of FIG. 1. The apparatus may include at least one processor; and at least one non-transitory memory including computer program code; the at least one memory and the computer program code may be configured to, with the at least one processor, cause the apparatus to: store, in a memory of a device, one or more identifiers, wherein each of the one or more identifiers is associated with one or more locations; determine that the device is within a range of a location associated with at least two of the identifiers; select which of the least two identifiers to retrieve from the memory of the device based at least partially upon past user behavior; and display an indication of the selected identifier on a display of the device.

Storing the at least one identifier may comprise capturing an image using a camera of the device and analyzing the image to determine the at least one identifier associated with the one or more locations. The indication of the selected identifier may be a scannable optical code. Storing the one or more identifiers may include receiving the one or more identifiers from another device, and the one or more identifiers may be at least one of an optical code and a radio frequency identifier. The determination that the device is within the range of the location associated with at least two of the identifiers may be based on a location signal. The location signal may be at least one of: a GPS signal, a Wi-Fi signal, and a RFID signal. The one or more identifiers may be at least one of: a coupon, a ticket, a membership card, and a payment card. The at least one memory and the computer program code may be configured to, with the at least one processor, cause the apparatus to: in response to a user input, display an indication of another identifier associated with the determined location. The device may be at least one of: a keychain device and a wearable device.

An example embodiment may be provided in a computer program product for displaying membership codes, the computer program product may include a computer readable storage medium having program instructions embodied therewith, the program instructions executable by a device to cause the device to: store, in a memory of the device, one or more identifiers, wherein each of the one or more identifiers is associated with one or more locations; determine that the device is within a range of a location associated with at least two of the identifiers; select which of the least two identifiers to retrieve from the memory of the device based at least partially upon past user behavior; and display an indication of the selected identifier on a display of the device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
storing, in a memory of a device, information for each of a plurality of identifiers, wherein the information comprises at least:
a first identifier associated with a first business, and one or more business locations of the first business, and
a second identifier associated with a second business, and one or more business locations of the second business;
determining a location of the device based on at least one of: a GPS signal and a wireless network signature;
detecting that the device is within a range of a business location of the first business and a business location of the second business based at least on the location of the device;
selecting one of the first identifier and the second identifier to retrieve from the memory of the device based at least partially upon past user behavior related to at least one of the first business and the second business; and
displaying at least the selected identifier on a display of the device.

2. The method of claim 1, wherein storing the information for at least the first identifier comprises:
capturing an image using a camera of the device;
analyzing the image to determine: the first business, the one or more business locations of the first business, and the first identifier.

3. The method of claim 1, wherein the selected identifier comprises a scannable optical code.

4. The method of claim 1, wherein storing the information for at least the first identifier comprises:
receiving the information for the first identifier from another device, and wherein the first identifier comprises at least one of an optical code and a radio frequency identifier.

5. The method of claim 1, wherein determining the location of the device is further based on a RFID signal.

6. The method of claim 1, wherein each of the plurality of identifier comprises at least one of: a coupon, a ticket, a membership card, and a payment card.

7. The method of claim 1, wherein the method further comprises:
in response to a user input, displaying the other one of the first identifier and the second identifier that was not selected.

8. The method of claim 1, wherein the device is at least one of: a keychain device and a wearable device.

9. The method of claim 1, wherein the display of the device is an e-ink display.

10. The apparatus of claim 1, wherein at least the first business is a retail business, and wherein the one or more locations of the first business comprise at least two or more separate retail store locations.

11. An apparatus comprising:
at least one processor; and
at least one non-transitory memory including computer program code;
the at least one memory and the computer program code may be configured to, with the at least one processor, cause the apparatus to:
store, in a memory of a device, information for each of a plurality of identifiers, wherein the information comprises at least:
a first identifier associated with a first business, and one or more business locations of the first business, and
a second identifier associated with a second business, and one or more business locations of the second business;
determine a location of the device based on at least one of: a GPS signal and a wireless network signature;
detect that the device is within a range of a business location of the first business and a business location of the second business based at least on the location of the device;
select one of the first identifier and the second identifier to retrieve from the memory of the device based at least partially upon past user behavior related to at least one of the first business and the second business; and
display at least the selected identifier on a display of the device.

12. The apparatus of claim 11, wherein storing the information for at least the first identifier comprises:
capturing an image using a camera of the device, and
analyzing the image to determine: the first business, the one or more business locations of the first business, and the first identifier.

13. The apparatus of claim 11, wherein the selected identifier comprises a scannable optical code.

14. The apparatus of claim 11, wherein storing the information for at least the first identifier comprises:
receiving the information from another device, and wherein the first identifier comprises at least one of an optical code and a radio frequency identifier.

15. The apparatus of claim 11, wherein determination of the location of the device is further based on a RFID signal.

16. The apparatus of claim 11, wherein each of the plurality of identifiers comprises least one of: a coupon, a ticket, a membership card, and a payment card.

17. The apparatus of claim 11, wherein the at least one memory and the computer program code may be configured to, with the at least one processor, cause the apparatus to:
in response to a user input, display the other one of the first identifier and the second identifier that was not selected.

18. The apparatus of claim 11, wherein the device is at least one of: a keychain device and a wearable device.

19. A method as in claim 11, wherein at least the first business is a retail business, and wherein the one or more locations of the first business comprise at least two separate retail store locations.

20. A computer program product for displaying membership codes, the computer program product comprising a computer readable storage medium having program instructions embodied therewith, the program instructions executable by a device to cause the device to:
store, in a memory of the device, information for each of a plurality of identifiers, wherein the information comprises at least:
a first identifier associated with a first business, and one or more business locations of the first business, and
a second identifier associated with a second business, and one or more business locations of the second business;
determine a location of the device based on at least one of: a GPS signal and a wireless network signature;

detect that the device is within a range of a business location of the first business and a business location of the second business based at least on the location of the device;
select one of the first identifier and the second identifier to retrieve from the memory of the device based at least partially upon past user behavior related to at least one of the first business and the second business; and
display at least the selected identifier on a display of the device.

* * * * *